United States Patent
Harada

(10) Patent No.: US 12,334,510 B2
(45) Date of Patent: Jun. 17, 2025

(54) LITHIUM SECONDARY BATTERY

(71) Applicant: Panasonic Intellectual Property Management Co., Ltd., Osaka (JP)

(72) Inventor: Tomohiro Harada, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1023 days.

(21) Appl. No.: 17/261,355

(22) PCT Filed: Feb. 20, 2019

(86) PCT No.: PCT/JP2019/006355
§ 371 (c)(1),
(2) Date: Jan. 19, 2021

(87) PCT Pub. No.: WO2020/026483
PCT Pub. Date: Feb. 6, 2020

(65) Prior Publication Data
US 2021/0280919 A1 Sep. 9, 2021

(30) Foreign Application Priority Data
Jul. 30, 2018 (JP) .................. 2018-142298

(51) Int. Cl.
*H01M 10/0587* (2010.01)
*H01M 4/02* (2006.01)
(Continued)

(52) U.S. Cl.
CPC ....... *H01M 10/0587* (2013.01); *H01M 4/131* (2013.01); *H01M 4/485* (2013.01);
(Continued)

(58) Field of Classification Search
CPC ........... H01M 10/0587; H01M 10/052; H01M 10/0525; H01M 10/0431; H01M 4/131;
(Continued)

(56) References Cited

U.S. PATENT DOCUMENTS

2006/0171876 A1* 8/2006 Wu .................. C01G 53/42
429/223
2006/0257724 A1* 11/2006 Kwon .............. H01M 50/103
429/94
(Continued)

FOREIGN PATENT DOCUMENTS

JP   H09-306470 A   11/1997
JP   2001-243957 A   9/2001
(Continued)

OTHER PUBLICATIONS

Office Action dated Jul. 26, 2023, issued in counterpart CN Application No. 201980048771.9, with its partial English translation. (10 pages).
(Continued)

*Primary Examiner* — Eugenia Wang
(74) *Attorney, Agent, or Firm* — WHDA, LLP

(57) ABSTRACT

A lithium secondary battery with a positive electrode active material including a composite oxide containing lithium and a transition metal. A molar ratio: $M_{Li}/M_{TM}$ of a total lithium amount per unit area $M_{Li}$ in a positive electrode and a negative electrode to a transition metal amount per unit area $M_{TM}$ in the positive electrode is 1.1 or less. The negative electrode includes a negative electrode current collector larger in area than the positive electrode mixture layer. In the wound electrode group in an unwound state, center lines dividing the positive electrode mixture layer and the negative electrode current collector along their winding direction into two halves are not on the same straight line. The negative electrode lead is connected at its one end to a (Continued)

non-facing region not facing the positive electrode mixture layer of the negative electrode current collector.

5 Claims, 3 Drawing Sheets

(51) Int. Cl.
    *H01M 4/131* (2010.01)
    *H01M 4/485* (2010.01)
    *H01M 10/052* (2010.01)
    *H01M 10/0525* (2010.01)
    *H01M 50/531* (2021.01)

(52) U.S. Cl.
    CPC ..... *H01M 10/052* (2013.01); *H01M 10/0525* (2013.01); *H01M 50/531* (2021.01); *H01M 2004/028* (2013.01)

(58) Field of Classification Search
    CPC ............... H01M 4/485; H01M 50/531; H01M 2004/028
    See application file for complete search history.

(56) References Cited

U.S. PATENT DOCUMENTS

2016/0240896 A1* 8/2016 Zhang ............... H01M 10/0569
2018/0131009 A1* 5/2018 Suehiro ............... H01M 50/186

FOREIGN PATENT DOCUMENTS

| | | | |
|---|---|---|---|
| JP | 2004-319311 A | 11/2004 | |
| JP | 2005-268206 A | 9/2005 | |
| JP | 2009-266737 A | 11/2009 | |
| JP | 2011-090794 A | 5/2011 | |
| JP | 2011-204652 A | 10/2011 | |
| JP | 2014-026832 A | 2/2014 | |
| JP | 2017-59367 A | 3/2017 | |
| JP | 2017-174523 A | 9/2017 | |
| JP | 2018-49681 A | 3/2018 | |
| WO | 2013/080459 A1 | 6/2013 | |
| WO | WO-2017010046 A1 * | 1/2017 | ........ H01M 10/0431 |
| WO | 2017/057012 A1 | 4/2017 | |

OTHER PUBLICATIONS

Extended (Supplementary)European Search Report dated Oct. 11, 2021, issued in counterpart EP Application No. 19844281.6. (51 pages).

International Search Report w/English translation and Written Opinion in Japanese dated May 14, 2019, issued in counterpart International Application No. PCT/JP2019/006355 (8 pages).

* cited by examiner

LITHIUM SECONDARY BATTERY

TECHNICAL FIELD

The present invention relates to an improvement of a lithium secondary battery.

BACKGROUND ART

Non-aqueous electrolyte secondary batteries are used for ICT devices, such as personal computers and smart phones, automobiles, power storage systems, and other applications. For the non-aqueous electrolyte secondary batteries used for such applications, further improvement in their capacity has been required. One known example of a high-capacity non-aqueous electrolyte secondary battery is a lithium ion battery. A high capacity of the lithium ion battery can be achieved by, for example, using graphite and an alloy-type active material, such as a silicon compound, in combination as a negative electrode active material. However, the improvement in capacity of the lithium ion battery is approaching to the limit.

As a non-aqueous electrolyte secondary battery superior in capacity to the lithium ion battery, a lithium secondary battery (lithium metal secondary battery) is seen as promising. In the lithium secondary battery, lithium metal deposits on the negative electrode during charge, and the deposited lithium metal dissolves in the electrolyte during discharge. Patent Literature 1 uses a foil of copper, nickel, iron, or stainless steel as a negative electrode of a lithium secondary battery.

CITATION LIST

Patent Literature

[PTL 1] Japanese Laid-Open Patent Publication No. 2001-243957

SUMMARY OF INVENTION

Technical Problem

However, when a foil of metal other than lithium metal is used to form a negative electrode as in Patent Literature 1, a wound electrode group including the negative electrode is in some cases damaged during repeated charge and discharge.

Solution to Problem

In view of the above, one aspect of the present invention relates to a lithium secondary battery, including: a wound electrode group; and a non-aqueous electrolyte, the wound electrode group including: a positive electrode, a negative electrode, a separator interposed between the positive electrode and the negative electrode, a positive electrode lead electrically connected to the positive electrode, and a negative electrode lead electrically connected to the negative electrode, the positive electrode and the negative electrode being wound with the separator between the positive electrode and the negative electrode, wherein the positive electrode includes a positive electrode mixture layer containing a positive electrode active material, and a positive electrode current collector; the positive electrode active material includes a composite oxide containing lithium and a transition metal: a molar ratio: $M_{Li}/M_{IM}$ of a total lithium amount per unit area $M_{Li}$ in the positive electrode and the negative electrode to a transition metal amount per unit area $M_{IM}$ in the positive electrode is 1.1 or less: the negative electrode includes a negative electrode current collector: the negative electrode current collector is larger in area than the positive electrode mixture layer; in the wound electrode group in an unwound state, a center line dividing the positive electrode mixture layer along a winding direction into two halves and a center line dividing the negative electrode current collector along the winding direction into two halves are not on a same straight line; and the negative electrode lead is connected at its one end to a non-facing region not facing the positive electrode mixture layer of the negative electrode current collector.

Advantageous Effects of Invention

According to the lithium secondary battery of the present invention, damage to the negative electrode can be suppressed.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
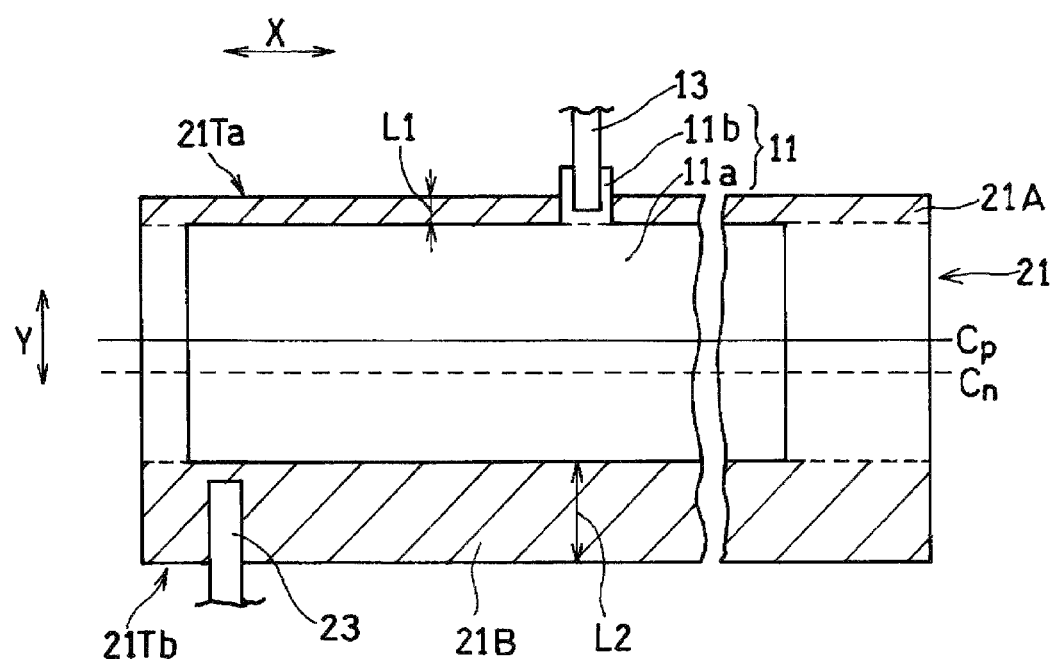
FIG. 1 A schematic top view showing a positive electrode, a positive electrode lead, a negative electrode, and a negative electrode lead, in an unwound state, according to an embodiment of the present invention.

A lithium secondary battery according to the present embodiment includes a wound electrode group and a non-aqueous electrolyte. The wound electrode group includes a positive electrode, a negative electrode, a separator interposed between the positive electrode and the negative electrode, a positive electrode lead electrically connected to the positive electrode, and a negative electrode lead electrically connected to the negative electrode. The positive electrode and the negative electrode are wound with the separator interposed therebetween.

The positive electrode includes a positive electrode mixture layer containing a positive electrode active material, and a positive electrode current collector. The positive electrode active material includes a composite oxide containing lithium and a transition metal. The negative electrode includes a negative electrode current collector. The negative electrode current collector is larger in area than the positive electrode mixture layer.

In the wound electrode group in an unwound state, a center line dividing the positive electrode mixture layer into two halves along a winding direction and a center line dividing the negative electrode current collector into two halves along the winding direction are not on the same straight line. The negative electrode is connected at its one end to a non-facing region not facing the positive electrode mixture layer of the negative electrode current collector.

Here, a molar ratio: $M_{Li}/M_{TM}$ of a total lithium amount per unit area $M_{Li}$ in the positive electrode and the negative electrode to a transition metal amount per unit area $M_{TM}$ in the positive electrode is 1.1 or less. This means that the negative electrode, immediately after fabrication, has substantially no lithium metal that can be discharged. In other words, the negative electrode includes a negative electrode current collector, but may not necessarily include a negative electrode active material layer. This increases the volume energy density of the battery. Note that in a fully discharged state also, the molar ratio: $M_{Li}/M_{TM}$ is 1.1 or less.

A fully discharged state of the lithium secondary battery refers to a state in which, given that the rated capacity of the battery is denoted by C, the battery is discharged to a state of charge (SOC) of equal to or less than C multiplied by 0.05. For example, when the battery is discharged at a constant current of 0.05 C to a lower limit voltage, it is referred to as being in a fully discharged state. The lower limit voltage is, for example, 2.5 V to 3.0 V.

In the lithium secondary battery, lithium metal deposits on a surface of the negative electrode during charge. Specifically, lithium ions contained in the non-aqueous electrolyte receive electrons on the negative electrode during charge and become lithium metal, which deposits on the surface of the negative electrode. This causes the negative electrode to expand. In the case of a wound electrode group, as a result of expansion of the negative electrode due to deposition of lithium metal, the negative electrode is subjected to a pressure that acts to pull the negative electrode in its plane direction.

The negative electrode of the lithium secondary battery is often made of a lithium metal foil or a laminate of a negative electrode current collector and a lithium metal foil. The lithium metal foil can extend so as to follow the deposition of lithium metal. The aforementioned pressure is thus absorbed, and the damage to the negative electrode is suppressed. Moreover, when the negative electrode is made of a lithium metal foil, on the surface of the negative electrode, nuclei for lithium deposition are uniformly and continuously present before charging. Therefore, metallic lithium tends to uniformly deposit on the negative electrode (lithium metal foil). The more uniformly the lithium metal deposits, the more the ductility is considered to increase. The aforementioned pressure is thus more likely to be absorbed.

On the other hand, in the lithium secondary battery according to the present embodiment, the negative electrode current collector is made of a metal material that does not react with lithium metal. Such a metal material is generally inferior in ductility as compared with lithium metal, meaning that it cannot extend following the deposition of lithium metal and is likely to have a crack along the winding axis direction. Moreover, in the case of using the above metal material for the negative electrode current collector, lithium metal may grow, after nuclei for lithium metal deposition are formed, from the nuclei. The nuclei are not always formed uniformly on the negative electrode current collector. Consequently, lithium metal is likely to deposit in a dendritic form or a granular form. The lithium metal deposited in such a form lacks ductility as compared to when the lithium metal is deposited uniformly. Furthermore, the aforementioned pressure may be non-uniformly applied to the negative electrode current collector, increasing the distortion of the negative electrode current collector. Therefore, the negative electrode current collector made of the above metal material is more likely to be damaged due to the deposition of lithium metal. According to the present embodiment, in a wound electrode group including such a negative electrode having no lithium metal, damage to the negative electrode can be suppressed.

Specifically, in the present embodiment, the negative electrode current collector is larger in area than the positive electrode mixture layer, and the positive electrode and the negative electrode are arranged such that, in the wound electrode group in an unwound state, a center line Cp dividing the positive electrode mixture layer along a winding direction into two halves and a center line Cn dividing the negative electrode current collector along the winding direction into two halves are not on the same straight line. By arranging as above, the non-facing region not facing the positive electrode mixture layer of the negative current collector is placed asymmetrical relative to the center line Cp. Thus, for example, when comparing two distances: a distance from one end of the positive electrode mixture layer along the winding direction to one end (first end) of the negative electrode current collector along the winding direction, the first end being closest to the one end of the positive electrode mixture layer; and a distance from the other end of the positive electrode current collector along the winding direction to the other end (second end) of the negative electrode current collector along the winding direction, the second end being closest to the other end of the positive electrode mixture layer, the latter is longer than the former. Therefore, even when the negative electrode expands, a crack that reaches the second end of the negative electrode current collector is unlikely to occur. In this way, damage to the negative electrode is suppressed.

Furthermore, the negative electrode lead is connected to the non-facing region of the negative electrode current collector. Lithium metal hardly deposits in the non-facing region of the negative electrode current collector, which can reduce the influence of the stress applied by the negative electrode lead to the negative electrode current collector, when the negative electrode expands. As a result, the occurrence of a crack in the negative electrode current collector can be further suppressed. The negative electrode lead is attached at its one end to the non-facing region by, for example, welding.

The center line Cp of the positive electrode mixture layer is a line connecting midpoints of two ends of the positive electrode mixture layer in the winding direction. Likewise, the center line Cn of the negative electrode current collector is a line connecting midpoints of two ends of the negative electrode current collector in the winding direction. The first end of the negative electrode current collector along the winding direction refers to an end of the negative electrode current collector, the end being parallel to the winding direction or forming an acute angle of 30° or less with the winding direction. The end of the positive electrode mixture layer along the winding direction refers to an end of the positive electrode mixture layer, the end being parallel to the winding direction or forming an acute angle of 30° or less with the winding direction.

The non-facing region can include a belt-like first region and a belt-like second region, the first region including the above first end of the negative electrode current collector and not facing the positive electrode mixture layer even in a wound state, the second region including the above second end of the negative electrode current collector and not facing the positive electrode mixture layer even in a wound state. The negative electrode lead may be connected at its one end to the first region or the second region. In this case, when the negative electrode expands, the influence by the negative electrode lead on the negative electrode current collector is further reduced. The negative electrode lead is preferably connected to the second region whose length in the winding axis direction is longer.

The above-described crack tends to occur usually in the vicinity of the positive electrode lead. This is because the negative electrode undergoes the stress from the positive electrode lead, too, when the negative electrode expands. To address this, a tab that does not have the positive electrode mixture layer may be provided on the positive electrode current collector, and the positive electrode lead may be connected at its one end to the tab. Specifically, the positive electrode current collector is configured to include a major portion and an extended portion extending from part of an end of the major portion along the winding direction, the extending portion not having the positive electrode mixture layer, and the positive electrode lead is connected at its one end to the extended portion. By configuring as above, when the negative electrode expands, the influence of the stress applied by the positive electrode lead to the negative electrode current collector is also reduced, and the occurrence of a crack in the negative electrode current collector is more likely to be suppressed.

The end of the major portion of the positive electrode current collector along the winding direction refers to an end of the major portion of the positive electrode current collector, the end being parallel to the winding direction or forming an acute angle of 30° or less with the winding direction. The end of the major portion of the positive electrode current collector along the winding direction usually coincides with the end of the positive electrode mixture layer along the winding direction.

The major portion is approximately rectangular, and its entire surface or at least part of the surface is covered with the positive electrode mixture layer.

The extended portion extends from the major portion, and, for example, is formed integrally with the major portion. At least part of the extended portion does not have the positive electrode mixture layer, and one end of the positive electrode lead is joined to the extended portion by, for example, welding, at a portion without the positive electrode mixture layer. Also, the extended portion at least partially overlaps with the non-facing region of the negative electrode current collector. The extended portion is reinforced with the negative electrode current collector, further with a separator, at the portion overlapping with the non-facing region, so that the boundary between the extended portion and the major portion is protected from damage. The extended portion may have any size that is large enough for the positive electrode lead to be connected at its one end thereto.

FIG. 1 is a schematic top view showing the positive electrode, the positive electrode lead, the negative electrode, and the negative electrode lead, in an unwound state, according to the present embodiment. A major portion 11a of a positive electrode current collector 11 is entirely provided with a positive electrode mixture layer (not shown). A positive electrode lead 13 is connected to the positive electrode current collector 11 in the vicinity of its center, and a negative electrode lead 23 is connected to a negative electrode current collector 21 in the vicinity of its end. Note that the configuration of the positive electrode and the negative electrode and the position of each lead are not limited thereto. In FIG. 1, for descriptive purposes, a first region 21A and a second region 21B of the negative electrode current collector 21 are shown by hatching.

The negative electrode current collector 21 is larger in size than the positive electrode mixture layer (positive electrode current collector 11), and the negative electrode current collector 21 has a non-facing region not facing the positive electrode mixture layer. The non-facing region includes: the belt-like first region 21A including a first end 21Ta along a winding direction X and not facing the positive electrode current collector 11 (major portion 11a) in a wound state; and the belt-like second region 21B including a second end 21Tb opposite to the first end 21Ta and not facing the positive electrode current collector 11 (major portion 11a) in a wound state. The negative electrode lead 23 is connected at its one end to the second region 21B.

The center line Cp dividing the positive electrode current collector 11 into two halves along the winding direction X and the center line Cn dividing the negative electrode current collector 21 into two halves along the winding direction X are not on the same straight line. Therefore, when comparing two distances: a distance L1 from one end of the positive electrode current collector 11 along the winding direction X to the first end 21Ta, closest to the above one end, of the negative electrode current collector 21; and a distance L2 from the other end of the positive electrode current collector 11 along the winding direction X to the second end 21Tb, closest to the above other end, of the negative electrode current collector 21, the latter is longer than the former (L1<L2). Thus, even when the negative electrode expands, a crack that extends along a winding axis direction Y and reaches the second end 21Tb of the negative electrode current collector 21 is unlikely to occur.

A ratio: L2/L1 of the length L2 to the length L1 is not limited. The ratio: L2/L1 may be, for example, 5 or more and 35 or less, may be 5 or more and 33 or less, and may be 9 or more and 20 or less. The size of the negative electrode current collector 21 and the positive electrode current collector 11, and the gap between the center line Cp and the center line Cn may be set as appropriate depending on, for example, the ratio: L2/L1. The length L1 is an average of the lengths of the first region in the winding axis direction at any five points. The length L2 is an average of the lengths of the second region in the winding axis direction at any five points.

The positive electrode current collector 11 includes the major portion 11a, and an extended portion 11b extending from part of the end of the major portion 11a along the winding direction X. The extended portion 11b has no positive electrode mixture layer and is connected with one end of the positive electrode lead 13.

A detailed description will be given below of the configuration of the lithium secondary battery.

(Negative Electrode)

The negative electrode is an electrode on which lithium metal deposits during charge. The lithium metal deposited on a surface of the negative electrode current collector dissolves as lithium ions in the non-aqueous electrolyte during discharge. The lithium metal thus deposited is formed from lithium ions in the non-aqueous electrolyte. The lithium ions contained in the non-aqueous electrolyte may be either derived from a lithium salt added to the non-aqueous electrolyte, or supplied from the positive electrode active material during charge, or both.

The negative electrode includes a negative electrode current collector formed of a metal material that does not react with lithium metal.

Examples of the metal material constituting the negative electrode current collector include copper (Cu), nickel (Ni), iron (Fe), and alloys containing these metal elements. Preferable examples of the alloys include a copper alloy and stainless steel (SUS). Among the metal materials, copper and/or a copper alloy is preferable in terms of its electrical conductivity. The copper content in the negative electrode current collector is preferably 50 mass % or more, and may be 80 mass % or more. The metal material is in the form of, for example, foil. The negative electrode current collector may have any thickness, and the thickness is, for example, 5 μm to 20 μm.

[Positive Electrode]

The positive electrode includes a positive electrode mixture layer containing a positive electrode active material, and a positive electrode current collector. The positive electrode mixture layer can be formed by applying a positive electrode slurry in which a positive electrode mixture including a positive electrode active material, a binder, and an electrically conductive agent are dispersed in a dispersion medium, onto a surface of the positive electrode current collector, followed by drying. The applied film after drying may be rolled, if necessary. The positive electrode mixture layer may be formed on one surface or both surfaces of the positive electrode current collector.

The positive electrode active material may be a composite oxide containing lithium and a transition metal. The molar ratio of the lithium to the transition metal: lithium/transition metal in the composite oxide is, for example, 0.9 to 1.1.

The positive electrode active material as above may be, for example, a composite oxide having a layered rock-salt structure. Specific examples of the positive electrode active material include $Li_aCoO_2$, $Li_aNiO_2$, $Li_aMnO_2$, $Li_aCo_bNi_{1-b}O_2$, $Li_aCo_bM_{1-b}O_c$, $Li_aNi_bM_{1-b}O_c$, and $LiMPO_4$, where M represents at least one selected the group consisting of Na, Mg, Sc, Y, Mn, Fe, Co, Ni, Cu, Zn, Al, Cr, Pb, Sb, and B. Here, $0<a\leq1.1$, $0\leq b\leq 0.9$, and $2\leq c\leq 2.3$. Note that "a" representing the molar ratio of lithium is a value immediately after the preparation of the active material and is subjected to increase and decrease during charge and discharge.

Particularly preferred is a nickel-containing composite oxide having a layered rock-salt structure. Examples of the composite oxide include $Li_aNi_xM_{1-x}O_2$, where M represents at least one selected from the group consisting of Mn, Co, and Al, $0<a\leq1.1$, and $0.3\leq x\leq1$. In view of achieving a higher capacity, more preferably, $0.85\leq x\leq1$. In view of the stability of the crystal structure, more preferred is a lithium-nickel-cobalt-aluminum composite oxide (NCA) containing Co and Al as elements represented by M: $Li_aNi_xCo_yAl_zO_2$, where $0<a\leq1.1$, $0.85\leq x<1$, $0<y<0.15$, $0<z\leq0.1$, and $x+y+z=1$. Specific examples of NCA include $LiNi_{0.8}Co_{0.15}Al_{0.05}O_2$, $LiNi_{0.8}Co_{0.18}Al_{0.02}O_2$, and $LiNi_{0.9}Co_{0.05}Al_{0.05}O_2$.

The binder may be a resin material, examples of which include: fluorocarbon resin, such as polytetrafluoroethylene (PTFE) and polyvinylidene fluoride (PVdF): polyolefin resin, such as polyethylene and polypropylene: polyamide resin, such as aramid resin: polyimide resin, such as polyimide and polyamide-imide: acrylic resin, such as polyacrylic acid, polymethyl acrylate, and ethylene-acrylic acid copolymer: vinyl resin, such as polyacrylonitrile (PAN) and polyvinyl acetate: polyvinyl pyrrolidone: polyether sulfone; and a rubbery material, such as styrene-butadiene copolymer rubber. These may be used singly or in combination of two or more kinds.

Examples of the conductive agent include: graphite, such as natural graphite and artificial graphite; carbon blacks, such as acetylene black: conductive fibers, such as carbon fibers and metal fibers: fluorinated carbon; metal powders, such as aluminum; conductive whiskers, such as zinc oxide and potassium titanate: conductive metal oxides, such as titanium oxide; and organic conductive materials, such as phenylene derivatives. These may be used singly or in combination of two or more kinds.

The form and the thickness of the positive electrode current collector may be respectively selected from the forms and the ranges corresponding to those of the negative electrode current collector. The positive electrode current collector may be made of, for example, stainless steel, aluminum (Al), an aluminum alloy, and titanium.

[Non-Aqueous Electrolyte]

The non-aqueous electrolyte used herein has lithium ion conductivity. The non-aqueous electrolyte contains a non-aqueous solvent, and lithium ions and anions dissolved in the non-aqueous solvent. The non-aqueous electrolyte may be in the form of liquid or gel.

The non-aqueous electrolyte in the form of liquid is prepared by dissolving a lithium salt in a non-aqueous solvent. When the lithium salt is dissolved in the non-aqueous solvent, lithium ions and anions are produced. In the non-aqueous electrolyte, however, some undissociated lithium salt may be present.

The non-aqueous electrolyte in the form of gel includes a liquid non-aqueous electrolyte and a matrix polymer. The matrix polymer is, for example, a polymer material that is gelated by absorbing the non-aqueous solvent. Examples of the polymer material include a fluorocarbon resin, an acrylic resin, and/or a polyether resin.

The lithium salt may be, for example, any known lithium salt used for a non-aqueous electrolyte of lithium secondary batteries. Specific examples thereof include: lithium salt anions, such as $BF_4^-$, $ClO_4^-$, $PF_6^-$, $CF_3SO_3^-$, and $CF_3CO_2^-$, imide anions, and oxalate anions. The non-aqueous electrolyte may contain these lithium salts singly or in combination of two or more kinds.

Examples of the imide anions include $N(SO_2C_mF_{2m+1})(SO_2C_nF_{2n+1})^-$, where m and n are each independently an integer of 0 or more. Here, m and n may be each independently 0 to 3, and 0, 1 or 2. Specific examples of the imide anions include bistrifluoromethylsulfonyl imide anion ($N(SO_2CF_3)_2^-$, TFSI$^-$), bisperfluoroethylsulfonyl imide anion ($N(SO_2C_2F_5)_2^-$), bis(fluorosulfonyl) imide anion ($N(SO_2F)_2^-$). Particularly preferred is TFSI$^-$.

The oxalate anions may contain boron and/or phosphorus. The oxalate anions may be an anion of an oxalate complex. Examples of the oxalate anions include difluoro oxalate borate ($BF_2(C_2O_4)^-$), bisoxalate borate ($LiB(C_2O_4)_2^-$), $B(CN)_2(C_2O_4)^-$, $PF_4(C_2O_4)^-$, and $PF_2(C_2O_4)_2^-$.

In view of further suppressing the dendritic deposition of lithium metal, the non-aqueous electrolyte may contain at least one selected from the group consisting of imide anions and oxalate anions. Particularly preferred are anions of boron-containing oxalates. The oxalate anions may be used in combination with one or more other anions. The other anions may be $PF_6^-$ and/or imide anions.

A lithium salt concentration in the non-aqueous electrolyte may be, for example, 0.5 mol/L or more and 3.5 mol/L or less. The lithium salt concentration is a sum of the concentrations of the dissociated lithium salt and the undissociated lithium salt. The anion concentration in the non-aqueous electrolyte may be set to 0.5 mol/L or more and 3.5 mol/L or less.

Examples of the non-aqueous solvent include esters, ethers, nitriles, amides, and halogen substituents of these. The non-aqueous electrolyte may contain one or more kinds of these non-aqueous solvents. Examples of the halogen substituent include fluorides.

Examples of the ester include carbonic esters and carboxylic acid esters. Examples of cyclic carbonic esters include ethylene carbonate, propylene carbonate, vinylene carbonate, and fluoroethylene carbonate (FEC). Examples of chain carbonic esters include dimethyl carbonate (DMC), ethyl methyl carbonate (EMC), and diethyl carbonate. Examples of cyclic carboxylic acid esters include γ-butyrolactone and γ-valerolactone. Examples of chain carboxylic acid esters include ethyl acetate, methyl propionate, and methyl fluoropropionate.

Examples of the ether include cyclic ethers and chain ethers. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

Examples of the nitrile include acetonitrile, propionitrile, and benzonitrile. Examples of the amide include dimethylformamide and dimethylacetamide.

[Separator]

The separator is interposed between the positive electrode and the negative electrode. The separator has high ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

[Lithium Secondary Battery]

Figure 2:
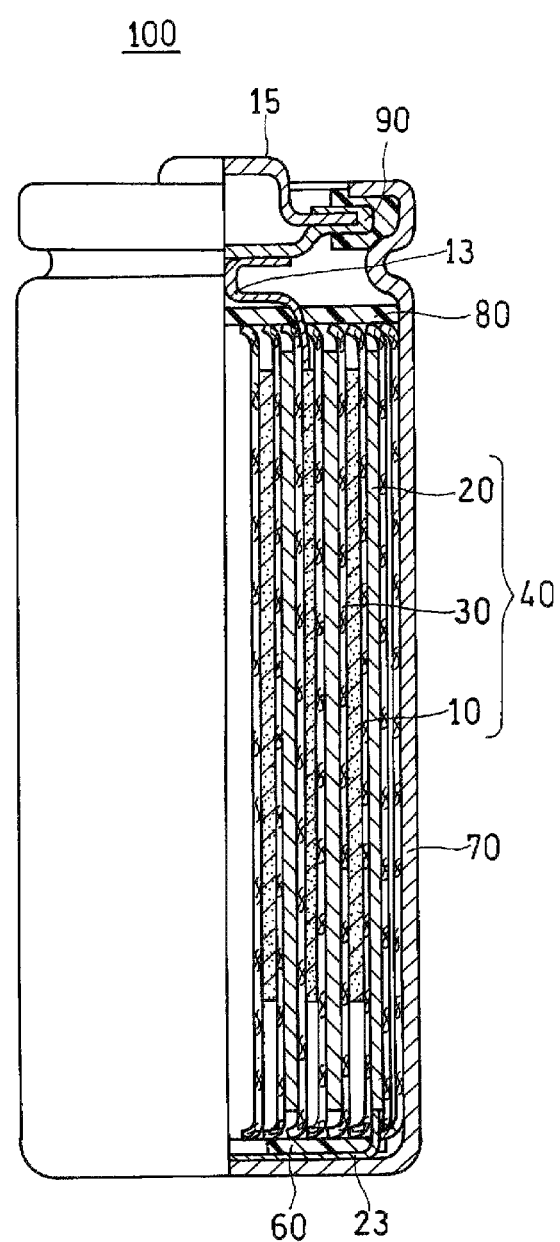
FIG. 2 A schematic longitudinal cross-sectional view of a lithium secondary battery according to an embodiment of the present invention.

FIG. 2 is a longitudinal cross-sectional view of an example of a cylindrical lithium secondary battery according to one embodiment of the present invention.

A lithium secondary battery 100 is a wound battery including a wound electrode group 40 and a non-aqueous electrolyte (not shown). The wound electrode group 40 includes a belt-like positive electrode 10, a belt-like negative electrode 20, and a separator 30. A positive electrode lead 13 is connected to the positive electrode 10, and a negative electrode lead 23 is connected to the negative electrode 20.

The positive electrode lead 13 is connected at its one end in the longitudinal direction to the positive electrode 10 and connected at the other end to a sealing plate 90. The sealing plate 90 is provided with a positive electrode terminal 15. The negative electrode lead 23 is connected at its one end to the negative electrode 20 and connected at the other end to the bottom of a battery case 70 serving as a negative electrode terminal. The battery case 70 is a bottom-closed cylindrical battery can, with one end in the longitudinal direction being open, and the other end being the bottom serving as the negative electrode terminal. The battery case (battery can) 70 is made of metal, and is formed of, for example, iron. The battery case 70 made of iron usually has a nickel-plated inner surface. On the top and the bottom of the wound electrode group 40, an upper insulating ring 80 and a lower insulating ring 60 both made of a resin are respectively disposed. Note that any known configuration may be used for the lithium secondary battery without limitation, other than for the wound electrode group.

The present invention will be specifically described below with reference to Examples and Comparative Examples. It should be noted, however, the present invention is not limited to the following Examples.

Example 1

(1) Production of Positive Electrode

A lithium nickel composite oxide ($LiNi_{0.8}Co_{0.18}Al_{0.02}O_2$), acetylene black, and PVdF were mixed in a mass ratio of 95:2.5:2.5, to which NMP was added. The mixture was stirred in a mixer (T.K. HIVIS MIX, available from PRIMIX Corporation), to prepare a positive electrode slurry. Next, the positive electrode slurry was applied onto each surface of Al foil. The applied film was dried, and then rolled to form a positive electrode with a positive electrode mixture layer having a density of 3.6 g/cm³ formed on both surfaces of the Al foil.

(2) Production of Negative Electrode

An electrolytic copper foil (thickness: 10 μm) was cut in a predetermined electrode size.

(3) Preparation of Non-Aqueous Electrolyte

FEC, EMC, and DMC were mixed in a volume ratio of FEC: EMC: DMC=20:5:75. In the resulting mixed solvent, lithium difluorooxalate borate and $LiPF_6$ were dissolved at a concentration of 0.3 mol/L and 1.0 mol/L, respectively, to prepare a non-aqueous electrolyte.

(4) Fabrication of Battery

The positive electrode material mixture layer was partially peeled off from the positive electrode obtained above, and an Al lead was attached at its one end to the portion from which the positive electrode material mixture layer was peeled off. To the negative electrode obtained above, a Ni tab was attached. In an inert gas atmosphere, the positive electrode and the negative electrode were stacked with a polyethylene thin film (separator) interposed therebetween, to form a stack.

In the stack, a center line Cp dividing the positive electrode mixture layer into two halves along the winding direction and a center line Cn dividing the negative electrode current collector into two halves along the winding direction were not on the same straight line, and the negative electrode had the aforementioned belt-like first region and the aforementioned belt-like second region. L2/L1 was 9. The negative electrode lead was connected at its one end to the second region.

The stack was spirally wound into a wound electrode body. The resulting electrode body was housed in a pouch-form outer case formed of a laminate sheet having an Al layer, into which the above non-aqueous electrolyte was injected. Then, the outer case was sealed, to form a lithium secondary battery T1.

Example 2

A lithium secondary battery T2 was produced in the same manner as in Example 1, except that the stack was formed such that L2/L1 was 10.

Example 3

A lithium secondary battery T3 was produced in the same manner as in Example 1, except that the stack was formed such that L2/L1 was 14.

Example 4

A lithium secondary battery T4 was produced in the same manner as in Example 1, except that the stack was formed such that L2/L1 was 22.

Example 5

A lithium secondary battery T5 was produced in the same manner as in Example 1, except that the stack was formed such that L2/L1 was 33.

Example 6

A lithium secondary battery T6 was produced in the same manner as in Example 2, except the below.

In the production of positive electrode (1), the Al foil with the positive electrode mixture layers formed thereon was cut so as to have a rectangular major portion and an extended portion extending from part of one long side of the major portion, and then, the positive electrode mixture layers formed on both surfaces of the extended portion were peeled off, to give a positive electrode.

In the fabrication of battery (4), the Al lead was attached at its one end to the extended portion. Then, the extended portion was partially overlapped with the first region of the negative electrode current collector.

Comparative Example 1

A lithium secondary battery R1 was produced in the same manner as in Example 2, except the below.

In the fabrication of battery (4), the center line Cp dividing the positive electrode mixture layer along the winding direction and the center line Cn dividing the negative electrode current collector along the winding direction were aligned on the same straight line. The negative electrode lead was attached at its one end to the negative electrode current collector at a place facing the positive electrode mixture layer in a wound state.

[Evaluation]

The batteries T1 to T6 and R1 obtained above were subjected to a charge-discharge test.

Figure 3:
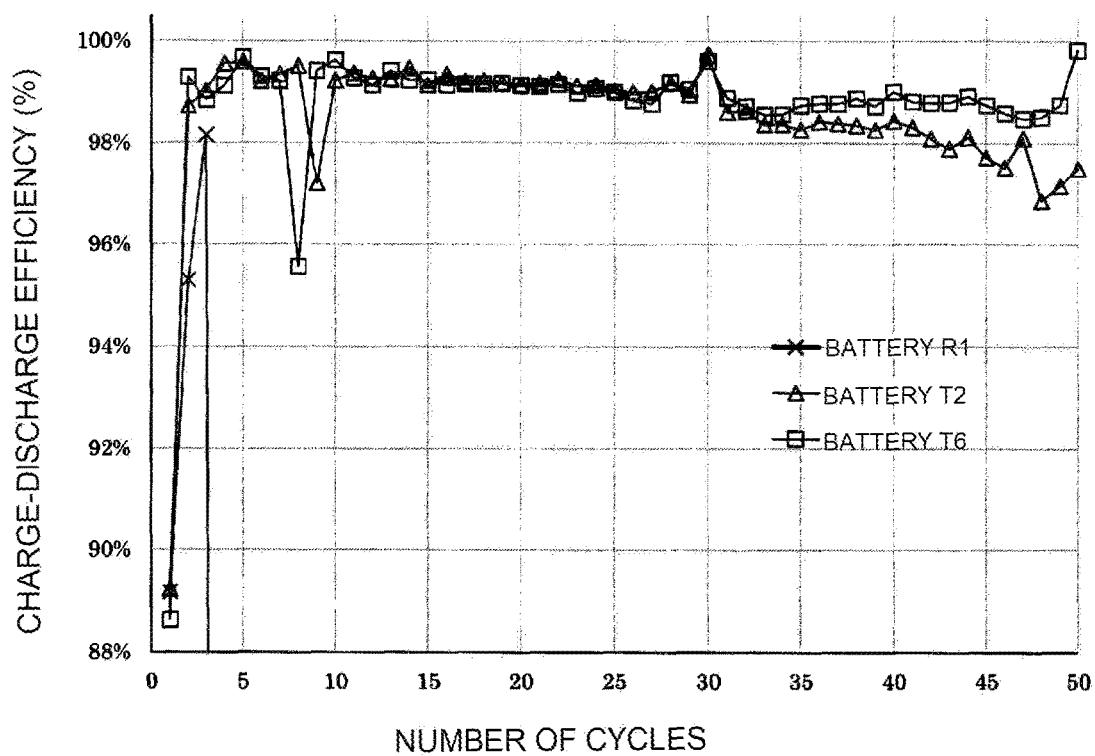
FIG. 3 A graph showing the results of a charge-discharge test in Examples and Comparative Example.

In the charge-discharge test, the batteries were charged under the following conditions in a constant temperature bath at 25° C., and then, after left to stand for 20 min, discharged under the following conditions. With the above charge and discharge regarded as one cycle, 50 cycles of charge and discharge were performed as a charge-discharge test. With respect to each of the batteries T1 to T6, an average charge-discharge efficiency up to 50 cycles was calculated. The evaluation results are shown in Table 1. With respect to each of the batteries T2, T6 and R1, a charge-discharge efficiency (=discharge capacity at the $n^{th}$ cycle/charge capacity at the $n^{th}$ cycle) was calculated every cycle. The evaluation results are shown in FIG. 3.

(Charge) Constant-current charge was performed at a current of 20 mA until the battery voltage reached 4.1 V, and then constant-voltage charge was performed at a voltage of 4.1 V until the current value reached 2 mA.

(Discharge) Constant-current discharge was performed at a current of 20 mA until the battery voltage reached 3.0 V.

TABLE 1

|  | Battery T1 | Battery T2 | Battery T3 | Battery T4 | Battery T5 | Battery T6 |
|---|---|---|---|---|---|---|
| L2/L1 | 9 | 10 | 14 | 22 | 33 | 10 |
| Average charge-discharge efficiency (%) | 98.75 | 98.75 | 98.80 | 98.68 | 98.70 | 98.53 |

Table 1 shows that the batteries T1 to T6 all exhibited an average charge-discharge efficiency of 98.5% or more. FIG. 3 shows that in the batteries T2 and T6, even having been subjected to 50 cycles of charge and discharge, the charge-discharge efficiency was maintained high. Especially in the battery T6, the charge-discharge efficiency showed no signs of decline even after 40 cycles. In contrast, in the battery R1, the charge-discharge efficiency drastically dropped at the 4th cycle of charge and discharge. The battery R1 was disassembled after the charge-discharge test, to check the negative electrode current collector. A crack was found in the negative electrode current collector.

INDUSTRIAL APPLICABILITY

The lithium secondary battery of the present invention is excellent in discharge capacity and cycle characteristics, and therefore are suitably applicable for electronic devices, such as cellular phones, smart phones, and tablet terminals, electric vehicles including hybrids and plug-in hybrids, and home storage battery systems combined with a solar cell.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: positive electrode
11: positive electrode current collector
11a: major portion
11b: extended portion
13: positive electrode lead
15: positive electrode terminal
20: negative electrode
21: negative electrode current collector
21Ta: first end
21Tb: second end
21A: first region
21B: second region
23: negative electrode lead
30: separator
40: wound electrode group
60: lower insulating ring
70): battery case
80: upper insulating ring
90: sealing plate
100: lithium secondary battery

The invention claimed is:

1. A lithium secondary battery, comprising: a wound electrode group; a non-aqueous electrolyte, and a bottom-closed cylindrical battery case,
the wound electrode group including:
a positive electrode, a negative electrode, a separator interposed between the positive electrode and the negative electrode, a positive electrode lead electrically connected to the positive electrode, and a negative electrode lead electrically connected to the negative electrode, the positive electrode and the negative electrode being wound with the separator between the positive electrode and the negative electrode, wherein
the negative electrode is an electrode on which lithium metal deposits during charge,
the positive electrode includes a positive electrode mixture layer containing a positive electrode active material, and a positive electrode current collector;
the positive electrode active material includes a composite oxide containing lithium and a transition metal;
a molar ratio: $M_{Li}/M_{TM}$ of a total lithium amount per unit area $M_{Li}$ in the positive electrode and the negative electrode to a transition metal amount per unit area $M_{TM}$ in the positive electrode is 1.1 or less;

the negative electrode includes a negative electrode current collector;

the negative electrode current collector is larger in area than the positive electrode mixture layer;

in the wound electrode group in an unwound state, a center line dividing the positive electrode mixture layer along a winding direction into two halves and a center line dividing the negative electrode current collector along the winding direction into two halves are not on a same straight line;

the negative electrode lead is connected at its one end to a non-facing region not facing the positive electrode mixture layer of the negative electrode current collector, the wound electrode group has a cylindrical shape, and the wound electrode group is disposed in the bottom-closed cylindrical battery case.

2. The lithium secondary battery according to claim 1, wherein the negative electrode current collector includes a first end along the winding direction, and a second end opposite to the first end;

the non-facing region includes a belt-like first region including the first end and not facing the positive electrode mixture layer in a wound state, and a belt-like second region including the second end and not facing the positive electrode mixture layer in a wound state; and the negative electrode lead is connected at the one end to the first region or the second region.

3. The lithium secondary battery according to claim 2, wherein the second region has a length L2 in a winding axis direction, and the first region has a length L1 in the winding axis direction, the length L2 being larger than the length L1, and the negative electrode lead is connected at the one end to the second region.

4. The lithium secondary battery according to claim 3, wherein a ratio: L2/L1 of the length L2 to the length L1 is 5 or more and 35 or less.

5. The lithium secondary battery according claim 1, wherein the positive electrode current collector includes a major portion and an extended portion extending from part of an end along the winding direction of the major portion, at least part of the extended portion is without the positive electrode mixture layer and overlaps the non-facing region of the negative electrode current collector, and the positive electrode lead is connected at its one end to the extended portion.

* * * * *